Patented July 24, 1923.

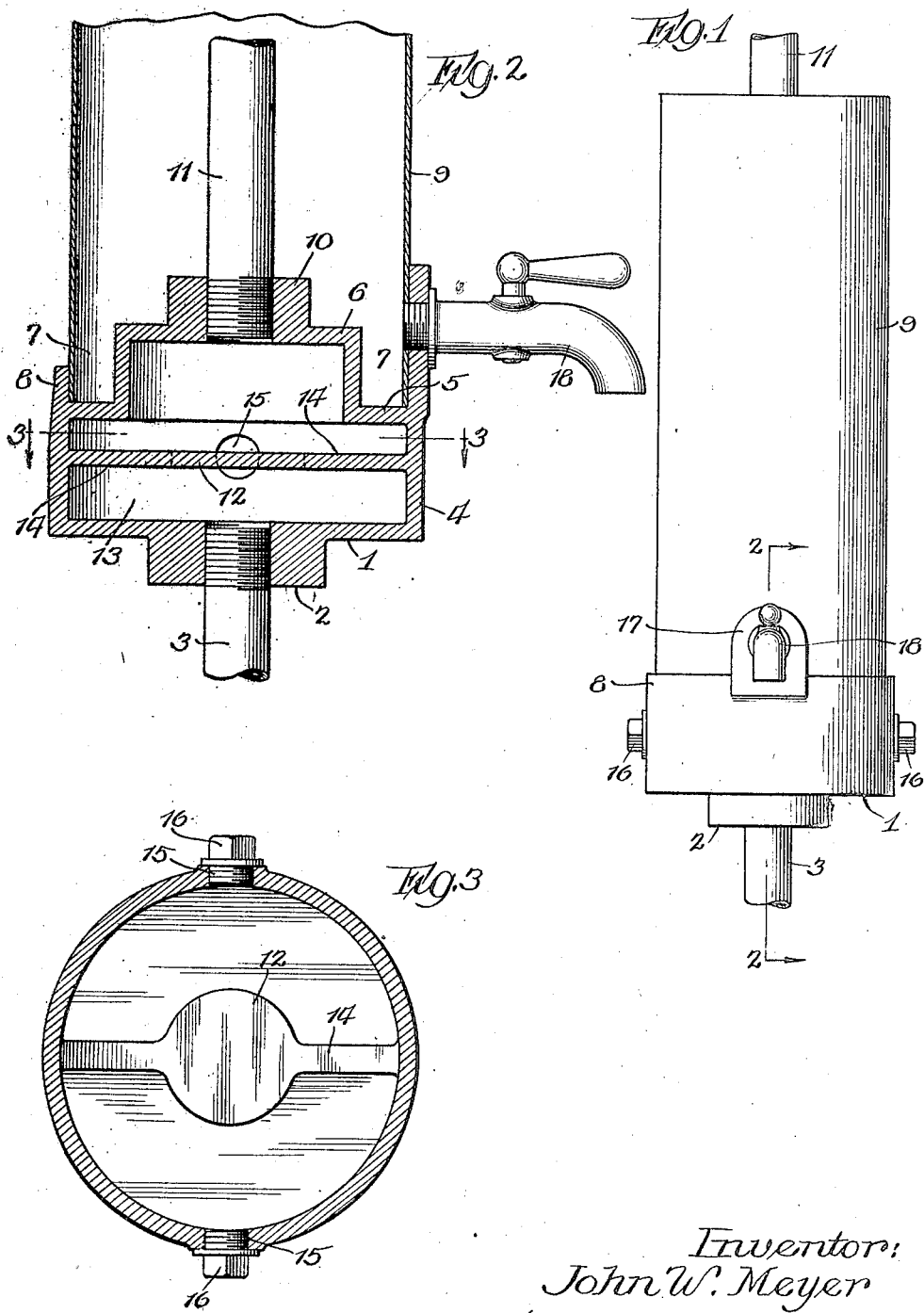

1,462,611

UNITED STATES PATENT OFFICE.

JOHN W. MEYER, OF FORT ATKINSON, WISCONSIN.

WATER HEATER.

Application filed July 20, 1922. Serial No. 576,216.

*To all whom it may concern:*

Be it known that I, JOHN W. MEYER, a citizen of the United States, and resident of Fort Atkinson, Jefferson County, Wisconsin, have invented a certain new and useful Improvement in Water Heaters, of which the following is a specification.

This invention relates to water heaters, more particularly to those which utilize the exhaust from an internal combustion engine to heat the water. Water heaters of this kind are useful in various ways, and the present invention contemplates the use of a heater of this kind for heating water in barns and other places where milking machines and other dairy machinery is employed, and where the exhaust from the internal combustion engine of a truck or automobile, or from some other engine, affords a cheap and convenient source of heat for heating the water.

Generally stated, therefore, the object of the invention is to provide a novel and improved construction whereby the exhaust from an internal combustion engine may be employed in a convenient and satisfactory manner to heat the water in a tank or other receptacle.

It is also an object to provide a novel and improved construction which can be employed to advantage without danger of throttling the exhaust in a manner to impair the efficiency of the engine.

Another object is to provide a novel and improved construction which can be manufactured at a comparatively low cost of production.

It is also an object to provide certain details and features of construction tending to increase the general efficiency and desirability of an exhaust water heater of this particular character.

To these and other useful ends the invention consists in matters hereinafter set forth and claimed and shown in the accompanying drawings in which—

Figure 1 is a side elevation of an exhaust water heater embodying the principles of the invention.

Figure 2 is an enlarged vertical section on line 2—2 in Figure 1.

Figure 3 is a horizontal section on line 3—3 in Figure 2.

As thus illustrated, the invention comprises a cast iron base having a bottom wall 1 with a screw threaded boss 2 disposed axially thereof and extending downward therefrom to receive the pipe 3 from the exhaust of the engine. The sides 4 of this cast iron base are cylindrical and extend upward a distance to support the top wall 5 which has a heat dome 6 located centrally thereof. This heat dome is of less diameter than the base, so that the annular space 7 is formed around the dome inside of the upstanding flange 8 formed around the top of the base. The cylindrical upright tank 9 is fitted tightly inside of the flange 8, to make a water tight joint, and is of a height to contain the required amount of water to be heated. The tank can be secured in place in any desired manner, so that it is supported by the base, and the latter can be mounted on any suitable support. The dome 6 has a top provided with a central boss 10 which is screw threaded to receive the vertical pipe 11 which extends upwardly and centrally of the tank to discharge the exhaust upwardly from the top of the structure. It will be seen that the pipes 3 and 11 are in alinement with each other, and it will also be seen that a spreader or baffle plate 12 is disposed in position within the chamber 13 of the base, directly in line with the two pipes, so that the exhaust will strike this plate and be spread around in the chamber 13 before escaping upwardly through the upper pipe. The arms 14 are integral with said plate 12, and are preferably integral with the cast iron base, the whole being one unitary or integral casting. In the process of casting the base holes 15 are formed, but these are closed by plugs 16, or by any suitable means, and can be employed for any useful purpose, as for cleaning out the heater if so desired. The base has an upstanding ear 17 at one side thereof to receive the faucet 18 by which the hot water is drawn off from the base of the tank.

With this construction, the member or element which receives the exhaust and radiates the heat into the water serves also as the supporting base of the cylindrical tank, and in its exposed position can be opened (by unscrewing the pipe 3 or the plugs 16, or both) for cleaning out the interior thereof. The heat is radiated into the water from the heat dome 6, and also from the sides of the exhaust pipe 11, in a manner that will be readily understood. The structure is very simple, therefore, and is comparatively inexpensive to manufacture, and is easy to instal and keep clean. A heater of this kind can be employed almost anywhere, or wherever an internal combustion engine can be found, very easily, and it is obvious that steam or other heated vapors or gases can be employed to heat the water, in the event that an internal combustion engine is not available. It will also be seen that the structure of the heater is such that it does not throttle the exhaust in a way that would interfere with the efficiency of the engine.

The one-piece casting thus provided, serving as the supporting base of the water tank, is necessarily gas tight, of course, except for the inlet pipe 3 and the outlet pipe 11 therefor. No combustion takes place in the hollow one-piece casting, and the heated fluid of any character simply flows into this hollow one-piece casting and then escapes therefrom through the standpipe in the water.

What I claim as my invention is—

1. In a water heater, an upright tank having a hollow one-piece gas tight supporting base forming an exposed support for the lower end thereof, so that the bottom wall of said base forms the exposed bottom of the tank, heat inlet means externally connected to said base to supply heat to the gas tight interior of said base to heat the water in said tank, and a heat outlet, said base being gas tight except for the heat inlet and outlet thereof, and being adapted in its exposed position to be opened for cleaning out the interior thereof.

2. A structure as specified in claim 1, said base being cast integrally in one piece, having a heat dome extending upward in said tank, and having a vertical pipe inserted in the top of said heat dome to form said outlet, said inlet means for supplying the heat comprising a pipe connected to the integral bottom of said base.

3. A structure as specified in claim 1, said base comprising a single integral casting having an inlet and an outlet for the heat supplied thereto, and having means for holding the lower edge of said tank in place to form a tight joint.

4. A structure as specified in claim 1, said base having an upstanding portion provided with a faucet to draw off the water from said tank.

5. A structure as specified in claim 1, said base having a spreader therein to deflect the heat laterally.

6. A structure as specified in claim 1, said base having a hollow heat dome extending upward in said tank, and an outlet for said dome.

JOHN W. MEYER.